(12) United States Patent
Lam et al.

(10) Patent No.: US 7,225,161 B2
(45) Date of Patent: May 29, 2007

(54) METHOD AND SYSTEM FOR INITIALIZING A KEY MANAGEMENT SYSTEM

(75) Inventors: Chui-Shan Teresa Lam, Houston, TX (US); Jameel ur Rahman Syed, Houston, TX (US)

(73) Assignee: Schlumberger Omnes, Inc., Houston, TX (US)

( * ) Notice: Subject to any disclaimer, the term of this patent is extended or adjusted under 35 U.S.C. 154(b) by 699 days.

(21) Appl. No.: 10/037,153

(22) Filed: Dec. 21, 2001

(65) Prior Publication Data

US 2003/0120598 A1 Jun. 26, 2003

(51) Int. Cl.
*G06Q 99/00* (2006.01)
*H04K 1/00* (2006.01)
*H04K 9/00* (2006.01)

(52) U.S. Cl. .............................. 705/51; 705/50; 705/64; 705/65

(58) Field of Classification Search .................. 705/50, 705/51, 57, 1, 64, 65
See application file for complete search history.

(56) References Cited

U.S. PATENT DOCUMENTS

| 5,373,561 | A | | 12/1994 | Haber et al. | |
| 5,495,533 | A | * | 2/1996 | Linehan et al. | 713/155 |
| 5,499,298 | A | * | 3/1996 | Narasimhalu et al. | 705/54 |
| 5,673,316 | A | * | 9/1997 | Auerbach et al. | 705/51 |
| 5,892,900 | A | * | 4/1999 | Ginter et al. | 726/26 |
| 6,009,177 | A | | 12/1999 | Sudia | |
| 6,035,402 | A | | 3/2000 | Vaeth et al. | |
| 6,047,374 | A | | 4/2000 | Barton | |
| 6,157,723 | A | | 12/2000 | Schultz | |
| 6,301,585 | B1 | * | 10/2001 | Milne | 707/103 R |
| 6,351,812 | B1 | | 2/2002 | Datar et al. | |
| 6,370,250 | B1 | | 4/2002 | Stein | |
| 6,658,568 | B1 | * | 12/2003 | Ginter et al. | 713/193 |
| 6,757,903 | B1 | * | 6/2004 | Havemose | 719/319 |
| 6,792,424 | B1 | | 9/2004 | Burns et al. | |
| 2001/0019614 | A1 | | 9/2001 | Madoukh | |
| 2001/0026619 | A1 | | 10/2001 | Howard, Jr. et al. | |

FOREIGN PATENT DOCUMENTS

| JP | 08288940 A | * | 11/1996 |
| WO | WO-00/19652 | | 4/2000 |
| WO | WO-01/17160 A1 | | 3/2001 |

OTHER PUBLICATIONS

NCSA HDF5 Software Library and Utilities; hdf.ncsa.uiuc.edu/HDF5/doc/Glossary.html.*
M2 Presswire, Dec. 6, 1996, "SCHLUMBERGER: Schlumbereger launches industry's most secure smart card".*

(Continued)

*Primary Examiner*—Calvin Loyd Hewitt, II
(74) *Attorney, Agent, or Firm*—Osha Liang LLP (57) ABSTRACT

A network system for key management including a server, a key management system providing process logic for key management system initialization located on the server, a key management system storage providing a secure data storage for the key management system, and an interface providing a means for inputting data into the key management system.

23 Claims, 9 Drawing Sheets

OTHER PUBLICATIONS

"Applied Cryptography", Second Edition, Schneier, p. 37.*
nCipher Corporation Ltd.; "Secure Execution Engine (S.E.E.) White Paper"; Copyright 2001, nCipher Corporation Limited; 12 pages.
nCipher Inc.; "Strengthen and Manage the Security of Your Public Key Infrastructure with nCipher"; Copyright 2001, nCipher Inc.; 8 pages.
nCipher Inc.; "nShield Hardware Security Module," Copyright 2001, nCipher Inc., 2 pages.
nCipherCorporation Limited; "nCipher Security World White Paper," Copyright 2001, nCipherCorporation Limited; 12 pages.
International Search Report dated Jan. 19, 2004 (9 pages).
T. Greanier; "Discover the Secrets of the Java Serialization SPI"; Articles Index No. XP-002262884; Jul. 2000 (6 pages).
L. Opyrchal, et al.; "Efficient Object Serialization in Java"; Publication No. XP-002242373; Department of Electrical Engineering and Computer Science, University of Michigan; May 1999; 6 pages.
Z. Canela, et al.; "Integrating Web-Based User Interfaces in TMN Systems", pp. 110-119; Alcatel Alsthom Corporate Research Center, France; 1998 IEEE; 10 pages.
ISA/European Patent Office, PCT Invitation to Pay Additional Fees for PCT/US03/05767, Jul. 25, 2003, 5 pages.
PGP Freeware for Windows 95, Windows 98, Windows NT, Windows 2000 & Windows Millennium, User's Guide Version 7.0, Jan. 2001, Network Associates, 246 pages.

* cited by examiner

Create Serialized File for Key Management Service

Type in the values twice for each field. Once to set the value, and again to confirm it.

| Field Name | Value 68 | Confirm 70 | Generate Randomly |
|---|---|---|---|
| card.ldap.admin.dn | ☐ |
| card.ldap.admin.password | ☐ |
| crypto.password | ☑ |
| crypto.salt | ☑ |
| crypto.count | ☑ |
| card.Cyberflex.Access.32K.MasterKeyMAC | ☑ |
| card.Cyberflex.Access.32K.MasterKeyENC | ☐ |
| card.Cyberflex.Access.32K.MasterKeyKEK | ☐ |

Please Specify Security Officer Keys

KEK PIN 76

KEK Salt [8 Characters long] 78

KEK Iteration [integer] 80

☐ Write KEK to file for automatic KMS Initialization

METHOD AND SYSTEM FOR INITIALIZING A KEY MANAGEMENT SYSTEM

BACKGROUND OF INVENTION

Connection of company networks to the Internet has resulted in a requirement for increased network security. This has resulted in some software systems, i.e. Financial Software Systems, requiring security information as part of their operation. Security information includes such information as encryption/decryption keys for encrypted databases, administrator passwords to access external resources such as a directory server, etc. Security information is typically stored in a configuration file that is accessible by the software systems.

While security information is used to ensure the security of particular software systems and the data they use, security information itself is typically not secure. Security information typically stored in a configuration file is in "clear text" i.e. text in ASCII format. However, some software systems include devices to safeguard security information, such as, storing security information in encrypted form. While this will protect the security information when it is not being used, it does not protect the security information when it is accessed. When security information is accessed by a particular software system, the security information must first be decrypted prior to being used. During this time the security information is in clear text and thus is exposed.

Figure 1:
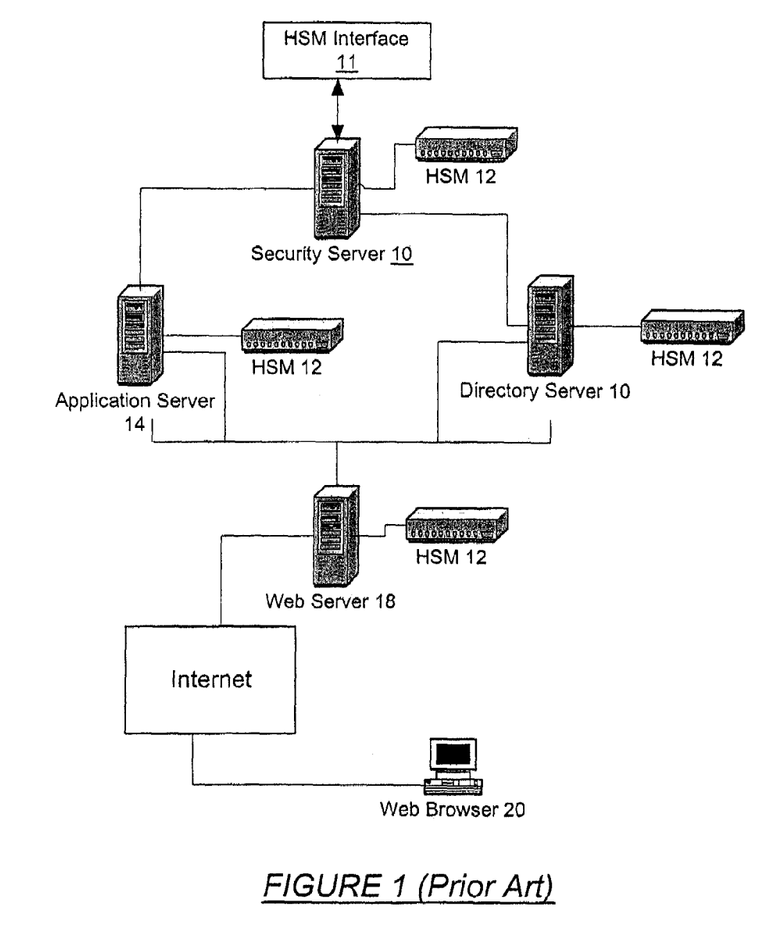
FIG. 1 illustrates a typical network system using Hardware Security Modules.

To protect security information, software system operators typically use Hardware Security Modules (HSM). HSM physically protect security information by providing tamper-resistant security information storage. Additionally, HSM perform functions such as security information generation, security information backup, security information management, etc. Security information inside an HSM is typically accessed by a proprietary software interface. FIG. 1 illustrates a typical network system using HSM.

Typically, the network system has a security server (10) that contains root security information. The root security information allows a user with that information to access any resource on the network. Security information used by the security server is stored on an HSM (12). Additionally, the security server (10) runs the HSM interface that allows the security server to control all HMS (12) on the network. The network system as also typically has an application server (14) and a directory server (16). The application server (14) typically runs the business logic for a server-based application. The directory server typically runs a directory service. The directory service enables a user to locate hosts and services on a network. The application server (14) and the directory server (16) also both store security information in HSM (12). Finally, the network system contains a web server (18). The web server (18) typically runs server software that uses HyperText Transfer Protocol to serve up HyperText Mark-up Language documents and any associated files and scripts when requested by a client, such as a Web browser (20). The web server (18) stores security information in a HSM (11).

When a web browser (20) is running a web application via a web server (18) and an application server (14), there may be a request to access sensitive data such as a financial data located on the application server (14). The application server (14) on behalf of the web browser (20) will request some security information from the HSM (12). The security information on the HSM (12) is then accessed via the HSM Interface (11).

SUMMARY OF INVENTION

In general, in one aspect, the invention relates to a network system for key management, comprising: a server, a key management system providing process logic for key management system initialization located on the server, a key management system storage providing a secure data storage for the key management system, and an interface providing a means for inputting data into the key management system.

In general, in one aspect, the invention relates to a network system for key management, comprising: a server, a key management system providing process logic for key management system initialization located on the server, a key management system storage providing a secure data storage for the key management system, an interface providing a means for inputting data into the key management system, and a client computer operatively connected to the server, wherein the client computer comprises a user interface to input data into the key management system.

In general, in one aspect, the invention relates to a method for initializing a key management system comprising: entering data into a key management system interface, entering a key encryption key into the key management system interface, combining data into a tuple, encrypting the tuple with the key encryption key to produce a secret token, storing the secret token in a vector, hashing the key encryption key, storing a hashed key encryption key in the vector, storing a list of keys in the vector, serializing the vector to produce a serialized file, and storing the serialized file in a key management system storage.

In general, in one aspect, the invention relates to a method for initializing a key management system comprising: entering data into a key management system interface, entering a key encryption key into the key management system interface, combining data into a tuple, encrypting the tuple with the key encryption key to produce a secret token, storing the secret token in a vector, hashing the key encryption key, storing a hashed key encryption key in the vector, storing a list of keys in the vector, serializing the vector to produce a serialized file, storing the serialized file in a key management system storage, encoding a key field of the tuple, randomizing the order of the list of keys, randomizing the order of the secret tokens in the vector, and generating data to encrypt.

In general, in one aspect, the invention relates to an apparatus for initializing a key management system comprising: means for entering data into a key management system interface, means for entering a key encryption key into the key management system interface, means for combining data into a tuple, means for encrypting the tuple with the key encryption key to produce a secret token, means for storing the secret token in a vector, means for hashing the key encryption key, means for storing a hashed key encryption key in the vector, means for storing a list of keys in the vector, means for serializing the vector to produce a serialized file, means for storing the serialized file in a key management system storage, means for encoding a key field of the tuple, means for randomizing the order of the list of keys, means for randomizing the order of the secret tokens in the vector, and means for generating data to encrypt.

Other aspects and advantages of the invention will be apparent from the following description and the appended claims.

DETAILED DESCRIPTION

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

The present invention relates to initializing a key management system. Further, the present invention relates to a method for securing keys within the key management system. Further, the present invention relates to a method for storing keys within the key management system.

Figure 2:
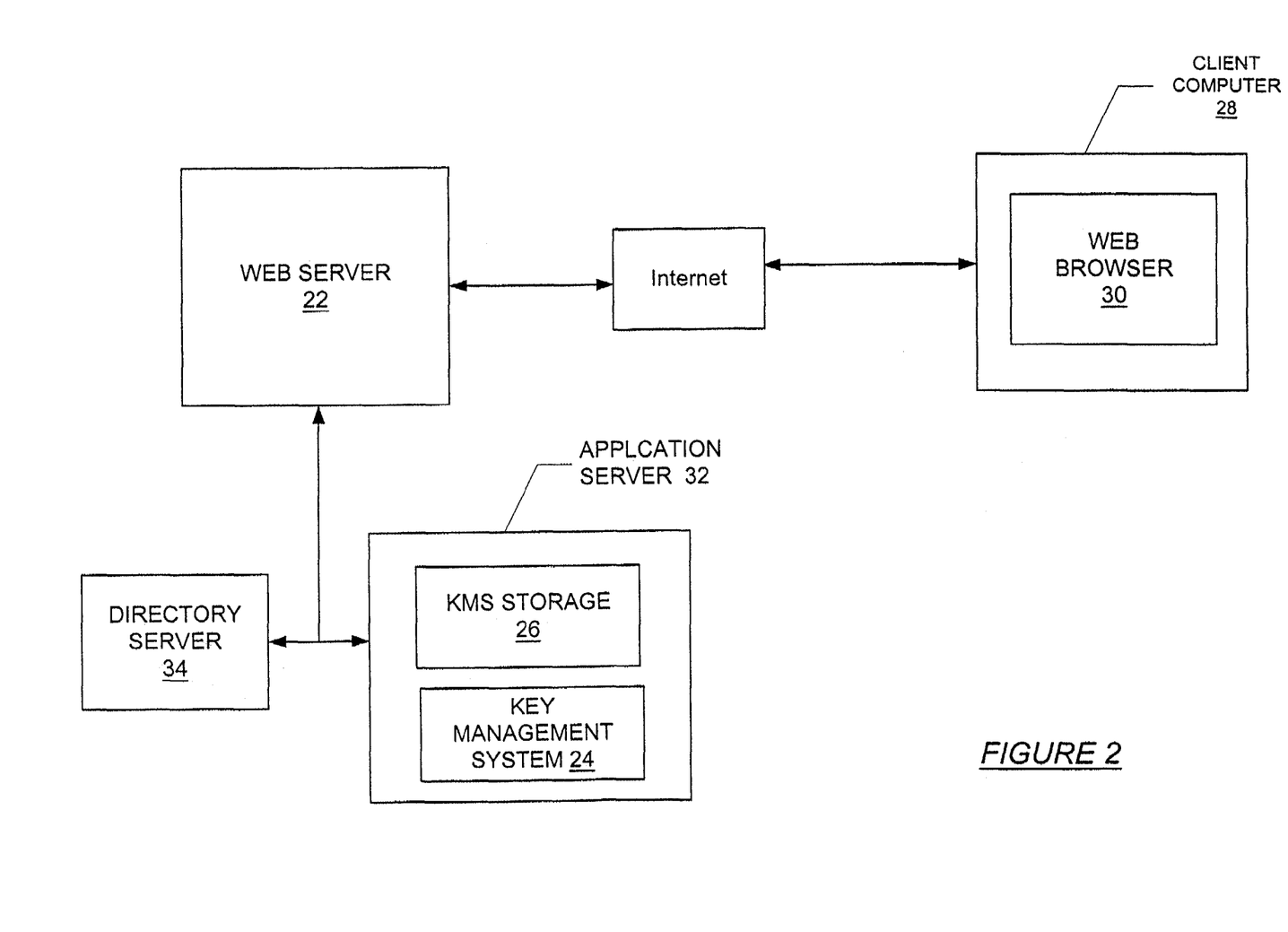
FIG. 2 illustrates a typical network system in accordance with one or more embodiments of the present invention.

FIG. 2 illustrates an exemplary network system in accordance with one or more embodiments of the present invention. The network system typically includes a web server (22), and a client computer (28) containing a web browser (30). Additionally, the web server (22) is typically operatively connected to an application server (32) containing a Key Management System (KMS) (24) and a Key Management System Storage (KMS Storage) (26), and to a directory server (34). The web server (22) and the web browser (30) typically communicate using Hypertext Transfer Protocol (HTTP) running over Transport Control Protocol/Internet Protocol (TCP/IP). The KMS (24) contains process logic, and the KMS storage (26) provides a secure data storage location e.g., a hard drive, where information processed by the KMS (24) is stored. Further, the KMS storage (26) is secured by the operating system via file permissions.

In one or more embodiments of the present invention, the KMS storage (26) is located on a different computer than the KMS (24). Further, the computers are connected via a secure connection such as a connection using 128-bit encryption running over a Secure Socket Layer (SSL).

While the present invention is described in according to one embodiment those skilled in the art will appreciate that the KMS (24) and KMS storage (26) may be distributed across the network system.

Figure 3:
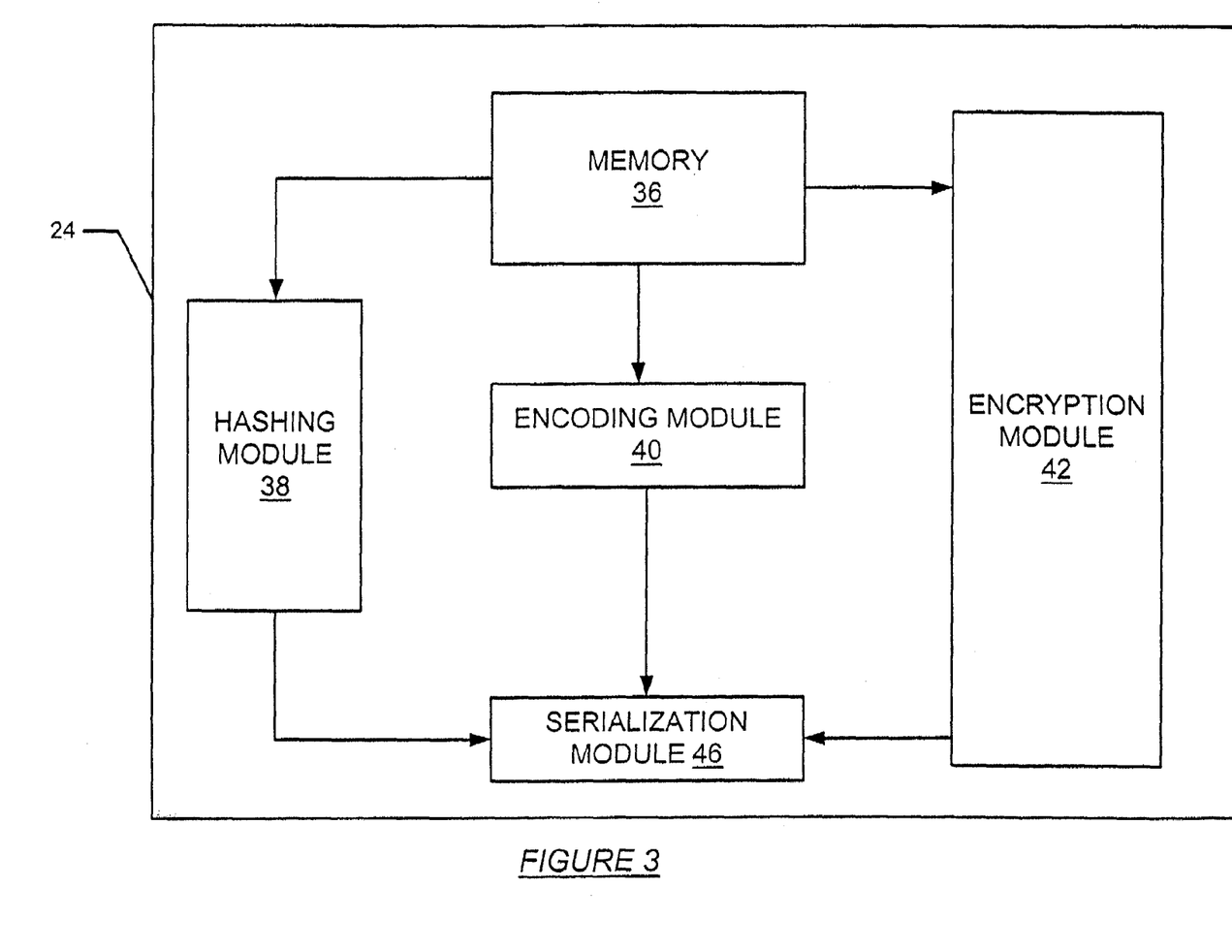
FIG. 3 illustrates a Key Management System in accordance with one or more embodiments of the present invention.

FIG. 3 illustrates a Key Management System (KMS) in accordance with one or more embodiments of the present invention. The KMS (24) includes a memory (36), a hashing module (38), an encryption module (42), an encoding module (40), and a serialization module (46). The memory cache (36) is a random access memory (RAM) subsystem in which frequently used data values are duplicated for quick access. Specifically, within the KMS (24) the memory (36) stores data initially sent to the KMS (24) prior to processing. The hashing module (38) hashes a Key Encryption Key (KEK) within the KMS (24). By applying a hashing function to a piece of data, the resulting data is a reorganized version of the original data. Additionally, hash functions used to secure data are typically designed such that they can not be "reverse engineered." The purpose of hashing the KEK is to provide a means to store the KEK in a secure format. In one embodiment of the present invention, MD5 is used as the hash function. Those in the art will appreciate that different hashing functions may be employed, e.g., MD2, MD4, etc.

The encryption module (42) contains encryption tools. The encryption tools include tools for key generation and tools for encryption. The key generation tools typically use a randomly generated seed as part of the input to the key generation tool. Specifically, within the KMS (24), the encryption module (42) includes process logic that generates the random seed for input to the key generation tool. The generated keys are used to access secure systems and/or applications such as a directory server. The encryption tool obtains data to be encrypted from the memory (36), or KMS generated keys from the key generation tools within the encryption module (42), and encrypts them using a specified encryption function. The encryption module (42) uses a KEK as the encryption key. In one embodiment of the present invention, the KEK includes three distinct parts: a KEK Pin, a KEK Salt, and a KEK Iteration. Constraints may be placed on all three parts of the KEK. For example, the KEK Pin may have a requirement to be at least 10 characters with a minimum of 3 numbers (N) and 3 letters (L) e.g., KEK Pin: NNNLNLLNLN. Depending on the encryption algorithm used, the KEK may have greater or fewer than three parts. Additionally, some encryption algorithms may also apply constraints to individual KEK parts. For example, in one embodiment of the present invention uses PBE with MD5 in combination with Triple Data Encryption Standard (DES) as the encryption algorithm. This imposes a constraint on the KEK salt by limiting the KEK salt to eight characters. Further, the KEK Iteration is limited to an integer. Those skilled in the art will appreciate that different encryption algorithms or combination of encryption algorithms may be used in conjunction with the present invention.

In one embodiment of the present invention, the encryption module uses a symmetric algorithm e.g., Triple Data Encryption Standard (DES). Symmetric algorithms rely on encryption and decrypting data using the same encryption key. Thus, a KEK is used to encrypt and decrypt data within the KMS.

In another embodiment of the present invention, the encryption module uses an asymmetric algorithm such as Rivest-Shamir-Adleman (RSA) algorithm. RSA creates a pair of related keys, one key to encrypt data and another key to decrypt data. Thus, a KEK may be used to encrypt the data and a corresponding Key Decryption Key (KDK) may be used to decrypt the data. The KEK and KDK are created simultaneously using the same algorithm e.g., RSA algorithm. The key generation tools within the encryption module generate the KEK and KDK using random input either generated by the user or by the key generation tool.

The encoding module (40) converts the data into a binary representation that is 64 bit encoded. Typically, encoding is performed to hide the clear text names of the data being encrypted. The serialization module (46) obtains input from the hashing module (38), the encoding module (40) and encryption module (42) and stores it in a vector. Once all the data has been received, the serialization module (46) processes the vector to create a serialized file. Serialization is the process of saving an object's state to a sequence of bytes, such that it may be rebuilt into a live object at some future time. Specifically, within the KMS the vector is converted into an object within the serialization module (46) and subsequently converted into a serialized file. The serialized file allows the data within the vector to persist beyond the time the KMS (24) is active. Additionally, the serialized file may be copied and transferred to another system where it may be stored as a backup. The process of creating the serialized filed is typically carried out using a Java™ Serialization Application Program Interface (API).

Figure 4:
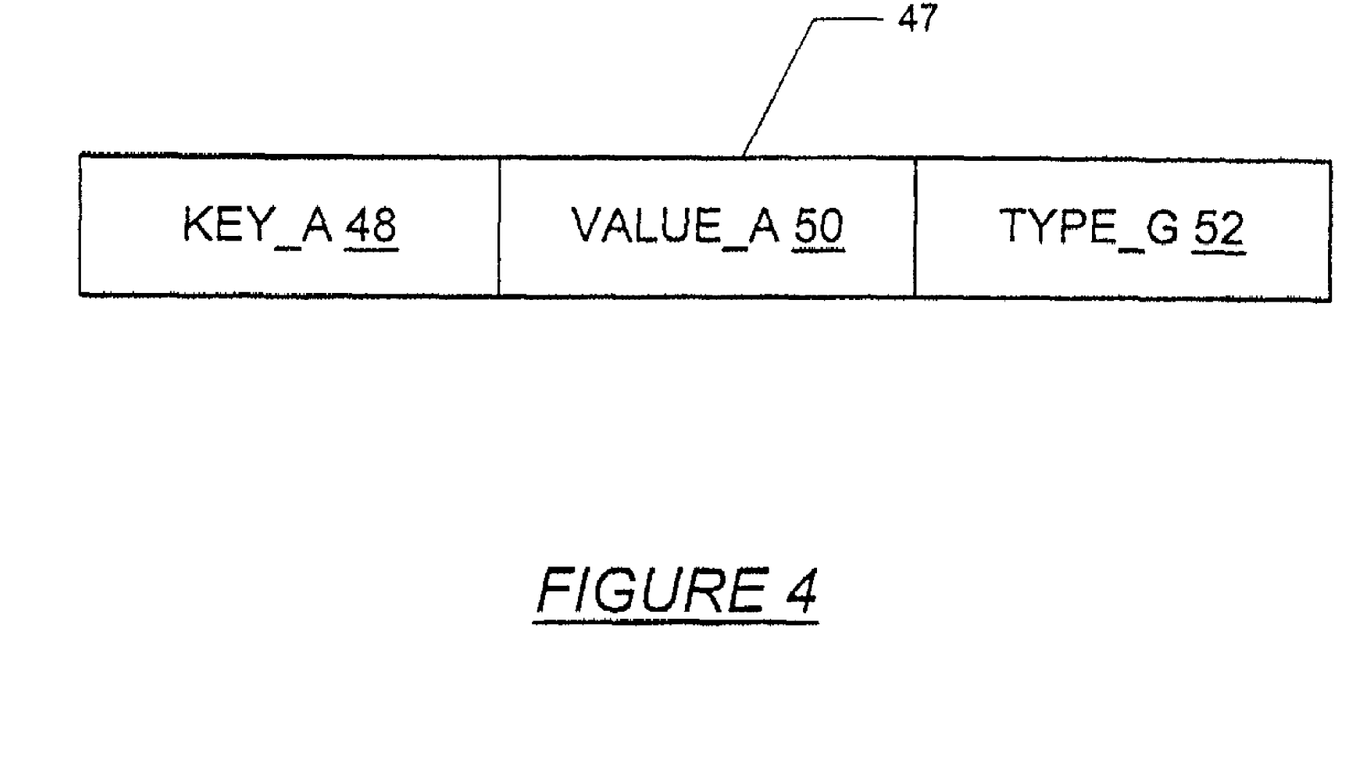
FIG. 4 illustrates a 3-tuple in accordance with an embodiment of the present invention.

The KMS (24) uses three main data structures: an n-tuple, a vector, and a serialized file. FIG. 4 illustrates a 3-tuple in accordance with an embodiment of the present invention. The 3-tuple (47) includes three data fields: a key field (48), a value field (50), and a type field (52). The key field (48) contains an identifying name of a value, e.g., Admin_Password. The value field (50) contains a value identified by the name in the key field (48). The type field (52) may contain either "USER" or "GENERATED." "USER" corresponds to a value in the value field (50) that was entered by the user. "GENERATED" corresponds to a value in the value field (50) that was generated by the KMS, specifically the key generation tool in the encryption module. The three fields are combined to produce a 3-tuple (47). Data input into the KMS is first stored as a 3-tuple (47) within the memory prior to processing.

Figure 5:
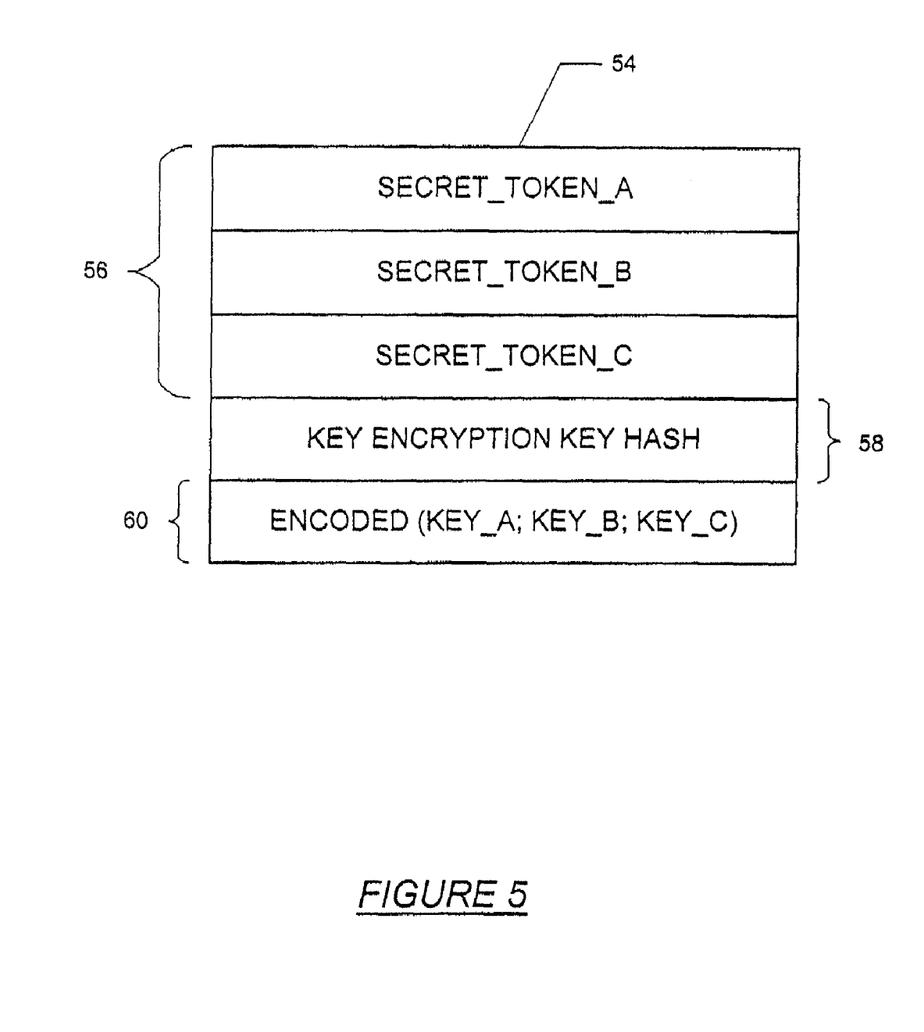
FIG. 5 illustrates a vector in accordance with an embodiment of the present invention.

FIG. 5 illustrates a vector in accordance with one or more embodiments of the present invention. In data structures, a vector is a one-dimensional array, where an array is a set of items arranged in a single column or row. Additionally, the vector data structure can also dynamically grow based on the size of the items within the set. Specifically, a vector (54) with a KMS includes three distinction portions: a secret token portion (56), a KEK Hash portion (58), and an encoded key portion (60). The secret token portion (56) contains all the encrypted 3-tuples, each encrypted 3-tuple is herein referred to as a secret token. In one embodiment of the present invention the secret tokens are stored in a random order within the secret token portion (56). Following the secret token portion (56) is the KEK Hash portion (58). The KEK Hash portion (58) holds the result of applying the hash function to the KEK. The KEK Hash is output from the Hashing Module. The final portion is the Encoded Key Portion (60), the encoded key portion (60) contains an encoded list of Keys (from the Key field in the 3-tuple). In one embodiment each key is 64-bit encoded and separated by a semi-colon. In another embodiment, the keys are combined into a list and the list is subsequently encoded. For example, if there were three keys then the encoded key portion (60) may have the following content: ENCODED (Key_A; Key_B; Key_C). Those skilled in the art will appreciate that the encoded keys may be separated in different manner. Encoded keys are output from the encoding module, and then stored in the vector (54). In one embodiment of the present invention, the list of Keys may be placed in a random order prior to encoding.

A serialized file is a flat-file. A flat-file is a file that consists of a single record type in which there is not embedded structure information that governs relationships between the records. Specifically, with serialized flat-files they are "flattened" by the Sun® Mircosystem's Java™ Serialization Application Program Interface (API) such that they may be rebuilt at some future time. The serialization module takes a vector as input and produces a serialized file as output.

Figure 6:
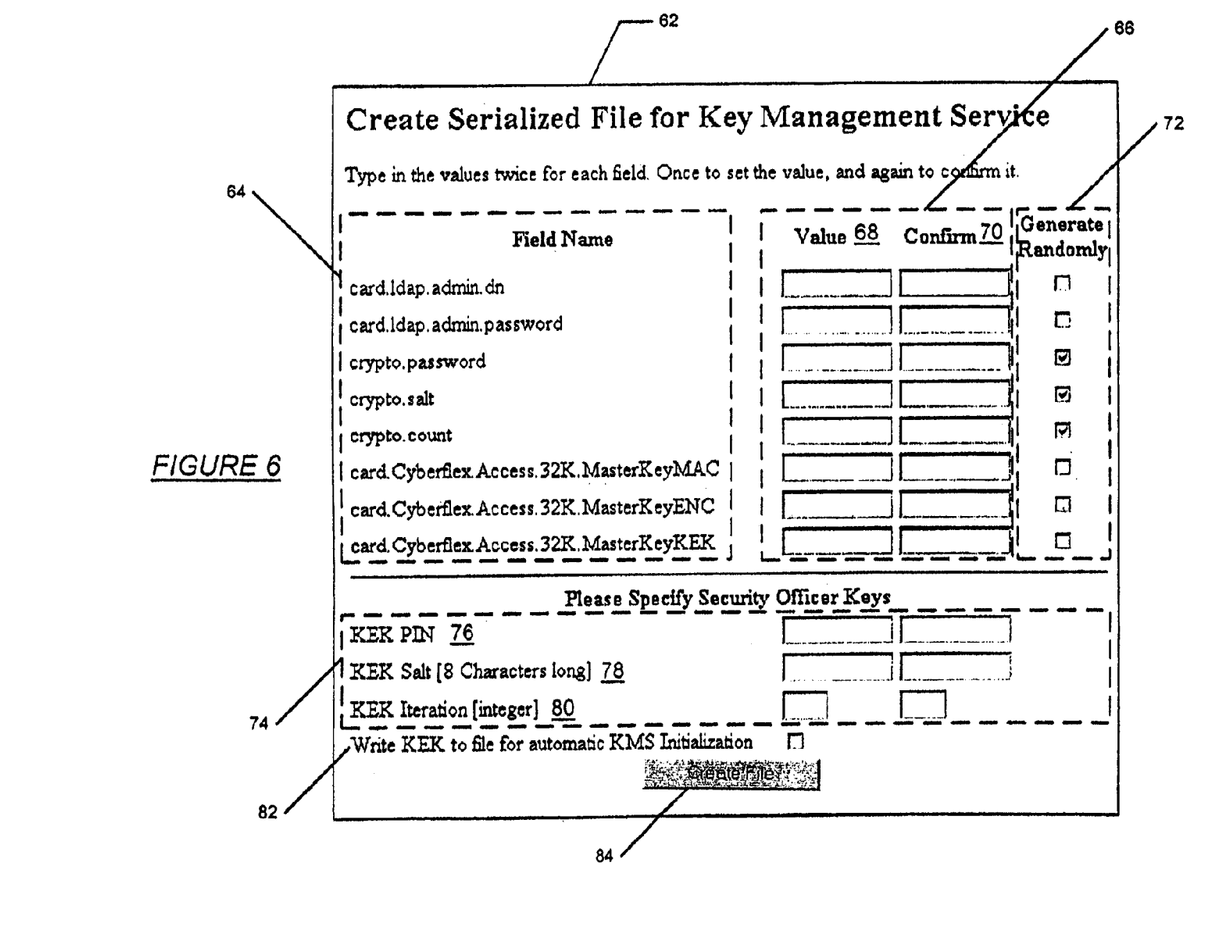
FIG. 6 illustrates a typical graphical user interface to input data, in one or more embodiments of the present invention.

FIG. 6 illustrates a typical graphical user interface (GUI) to input data, in one or more embodiments of the present invention. The GUI (60) may be part of a stand alone application or integrated into a web browser. The GUI (60) provides the user with a means to input data into the KMS. A field name section (64) contains the key's e.g., card.ldap.admin.dn, which are stored in the key field of the 3-tuple. A value input section (66) contains two input text boxes: a value text box (68) and a confirm text box (70). The user inputs a value corresponding to a key in the field name section (64) into the corresponding value text box (68), the user then re-enters the value in the confirm text box (70). In one embodiment of the present invention the text typed into the value text box (68) and the confirm text box (70) is displayed as "clear text." In another embodiment of the present invention the text typed into the value text box (68) and the confirm text box (70) is displayed as a series of asterisks. A generate randomly section (72) contains a series of checkboxes, one for each key. The user may check a box for a given key, which prompts the KMS to generate a value for that particular key. As mentioned above, the KMS generates the values using a key generation tool within the encryption module.

Once the user enters data into the above mentioned sections the user then proceeds to enter in a Key Encryption Key (KEK) section (74) on the GUI (62). The KEK section (74) on the GUI contains text-input fields for each portion of the KEK that is required. For example, referring to FIG. 6, the KEK section (74) requires the user to input three pieces of information: a KEK PIN (76), KEK Salt (78), and a KEK Iteration (80). Similar to entering data into the value input section (66), the KEK section also requires the user to enter the data twice. In one embodiment of the present invention the text typed into the KEK section, (74) is displayed as clear text. In another embodiment of the present invention the text typed into the KEK section, (74) is displayed as a series of asterisks.

Once all the data has been entered user may check the "Write KEK to file for automatic KMS Initialization" checkbox (82). By checking the "Write KEK to file for automatic KMS Initialization" checkbox, the KEK section (74) information will be saved in a file that is accessed when the KMS is used. If this box is not checked, then every time the KMS is started the user will have to enter the KEK section (74) information. After the user has made a decision to check the "Write KEK to file for automatic KMS Initialization" checkbox (82), the user may click a "Create File" Button (84) to input the data into the KMS for it to be processed.

Referring again to FIG. 2, consider the following scenario. A network operator adds a directory server (34) to the companies existing network infrastructure e.g. a web server (22) and application server (32). The application server (32) is running an security application that is used to verify remote web users. The security application stores user name and password information in encrypted form on the directory server (34) running a Lightweight Directory Application Protocol (LDAP) compliant directory service. Thus, the security application requires an administrator level username and password to logon onto the LDAP-compliant directory service running on the directory server (34). Additionally, the security application requires the decryption keys to decrypt the data on the directory server (34). The present invention allows all the required access data i.e., administrator username, administrator password, decryption key to be stored on the web server (22) in a secure format.

The user initially enters all the required access data into a KMS (26) GUI. The GUI may be integrated with a web browser (30). The web browser is typically running a secure connection such as Secure Socket Layer (SSL). The user then proceeds to create a serialized file which contains all the required data in a secure format and then stores the serialized file in the KMS storage (26).

Figure 7:
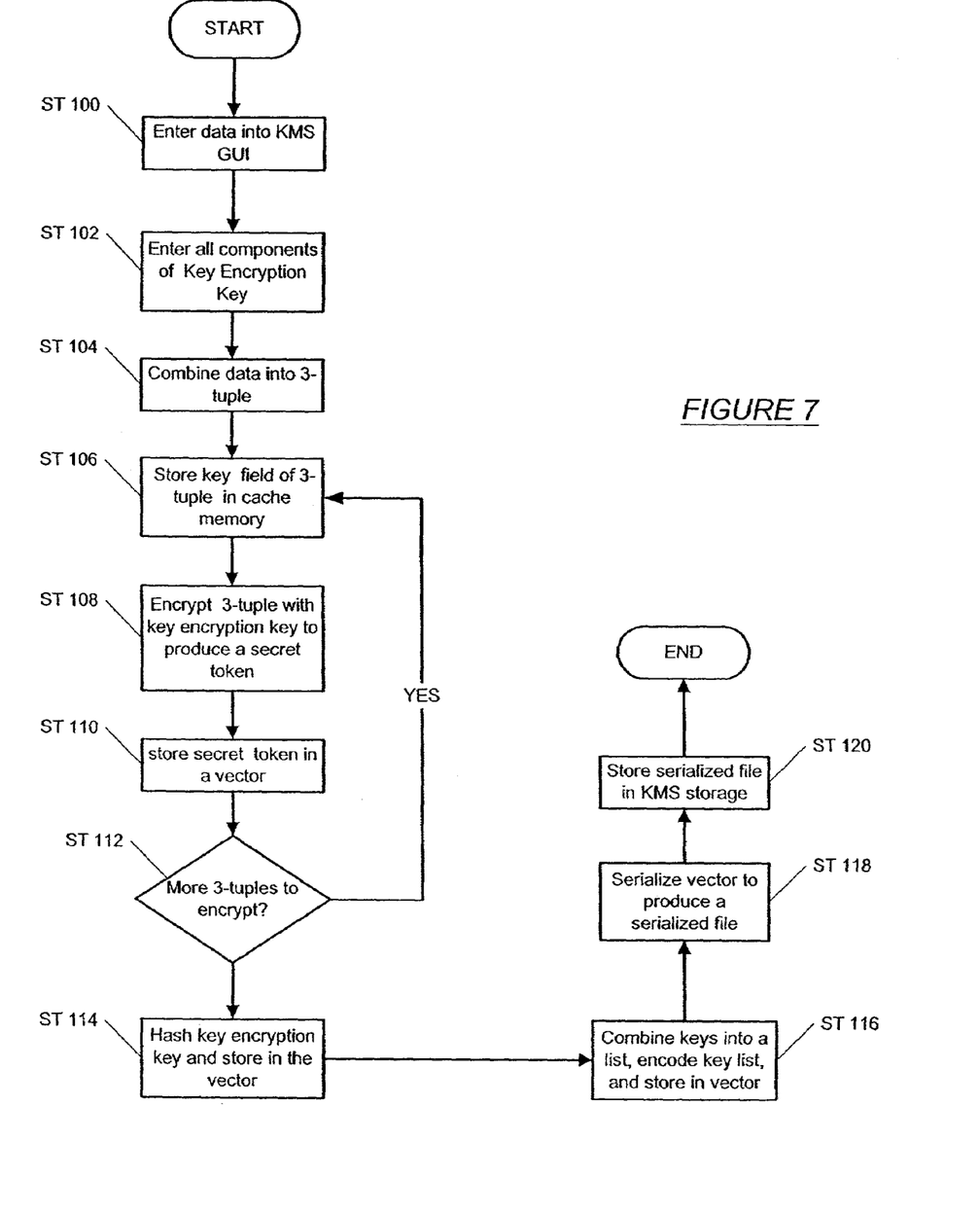
FIG. 7 illustrates, in flow chart form, the typical steps involved in initializing a Key Management System.

FIG. 7 illustrates, in flow chart form, typical steps involved in initializing a Key Management System. The user enters data into the KMS GUI (Step 100). For example, referring to the above scenario, a user may enter the administrator username, administrator password, etc. The user then enters a KEK into the GUI (Step 102). Once the user clicks the "Create File" Button, the KMS combines the data into 3-tuples as mentioned above (Step 104). The key field of a first 3-tuple is then stored in the memory (Step 106). The KMS then encrypts the 3-tuple using the KEK as the encryption key to produce a secret token (Step 108). The secret token is then stored in a vector (Step 110). If there are any more 3-tuples to encrypt (Step 112), the above steps are repeated. If there are no more 3-tuples to encrypt (Step 112), the KMS hashes the KEK with a specified hashing algorithm. The result of hashing the KEK is then stored in the vector (Step 114). The KMS then combines the keys into a list, 64 bit encodes them and stores them in the vector (Step 116). The vector is then processed by the serialization module to produce a serialized file (Step 118). The serialized file is then stored in the KMS storage (Step 120).

In one embodiment of the present invention, the KEK is stored on a smart card and input into the KMS via a GUI that has an interface with a smart card reader.

Figure 8:
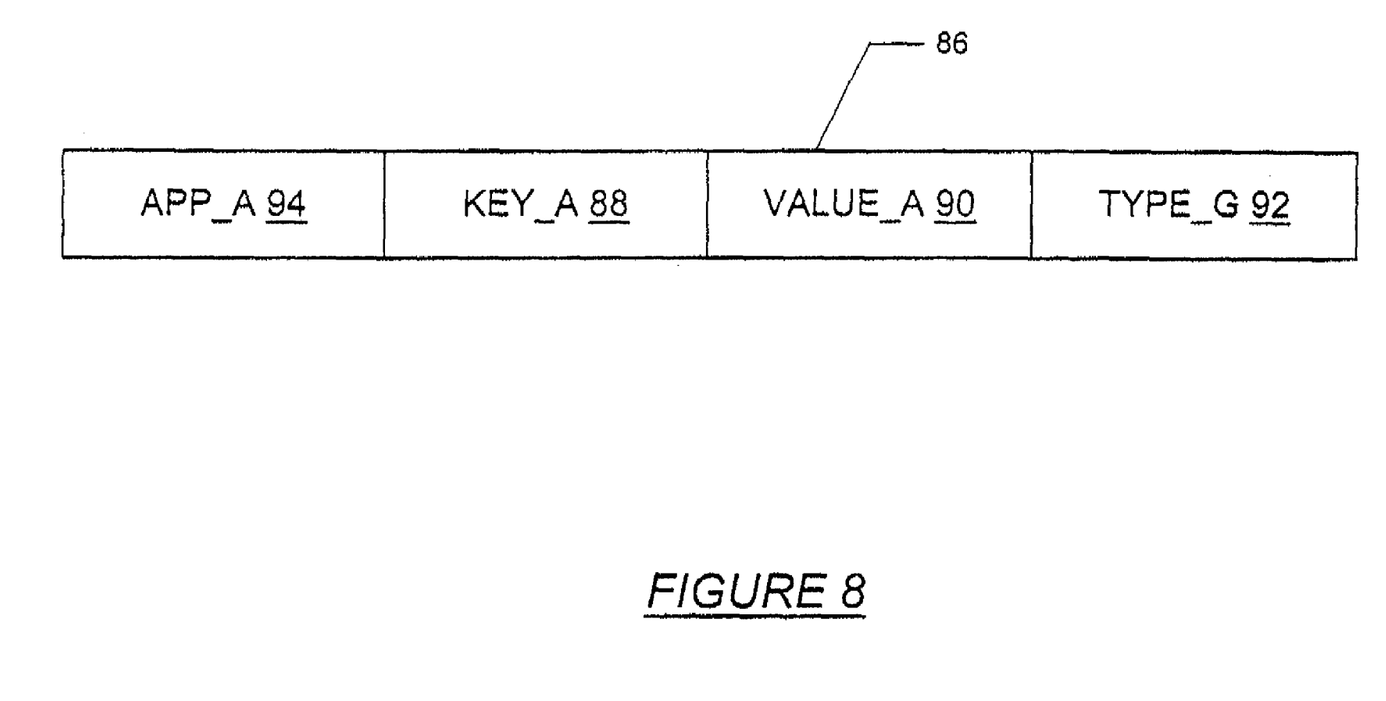
FIG. 8 illustrates a typical 4-tuple used in another embodiment of the present invention.

In one embodiment of the present invention, the 3-tuple is converted to a 4-tuple allowing the KMS to scale to use with multiple application simultaneously. For example, consider the above scenario with the security application. If another application such as an accounting application is added to the application server, then a another set of data will be required e.g., administrator name, administrator password, etc to access the accounting application and the accounting application data. FIG. 8 illustrates a typical 4-tuple used in a KMS serving multiple applications. The 4-tuple (86) contains all three fields that the 3-tuple contains e.g., a key field (88), a value field (90) and a type field (92) plus an additional field: an application name field (94). The application name field (94) contains the name of the application.

Figure 9:
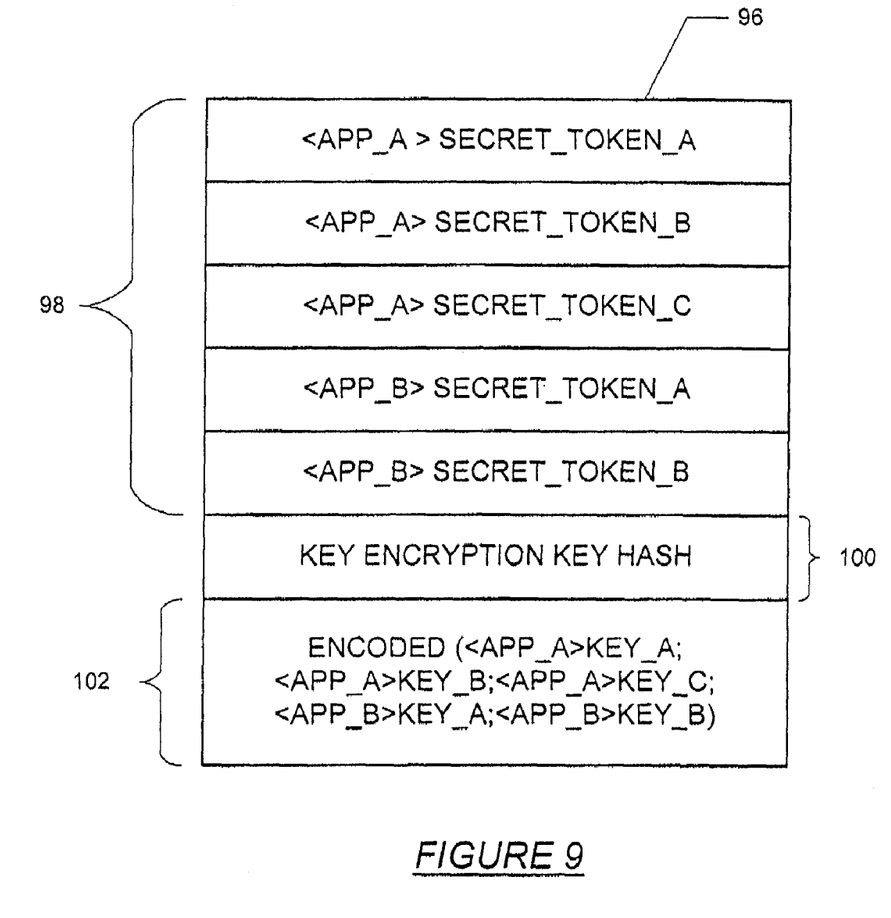
FIG. 9 illustrates a vector in accordance with another embodiment of the present invention.

In addition to modification made to the 3-tuple, the content in the vector is also modified. FIG. 9 illustrates a typical vector used in a KMS serving multiple applications. A modified vector (96) contains the same portions as the previous embodiment of the vector e.g., a secret token portion (98), a key encryption key portion (100), and an encoded key portion (102). All content in the secret portion (98) of the modified vector (96) is tagged with the application name obtained from the application name field in the 4-tuple. The application name tag may be 64-bit encoded. The secret tokens for all applications are then stored in the modified vector. The content in the encoded key portion (102) of the modified vector (96) is modified such that each key is tagged with an application name. All the tagged keys are then combined into a list, 64-bit encoded, and stored in the vector. The vector is then serialized as described above. The KMS GUI is modified to allow input of the application name.

Advantages of the present may include one or more of the following. In some embodiments, the present invention provides a software solution to key management system. Further, the present invention may be integrated into existing network infrastructure without requiring additional hardware. In some embodiments, the present invention is scalable to manage keys for multiple applications. In some embodiments, the present invention allows sensitive data to be readily backed-up and recovered. In some embodiments of the present invention, the keys are never stored as clear text. Further, the present invention allows the KMS to be distributed over multiple servers within a network system. Further, the present invention allows the KEK to contain multiple portions e.g., salt, count, integer, such that KEK may be distributed to multiple security officers. Those skilled in the art can appreciate that the present invention may include other advantages and features.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for securing encryption keys in a key management system (KMS) comprising:
   receiving data into the KMS, wherein the data comprises a key, a key name, and a key type, and wherein the data is received from a client over a network;
   receiving at least one key encryption key (KEK) into the KMS, wherein the KEK is received from the client using a smart card interfacing over the network with the KMS, wherein the smart card stores the KEK;
   encrypting the key, the key name, and the key type using the KEK to generate a secret token, wherein the encryption is performed by the KMS;
   hashing the KEK to generate a hashed KEK;
   generating a vector comprising the secret token and the hashed KEK, wherein the secret token comprises the encrypted key;
   serializing the vector to generate a serialized file; and
   storing the serialized file in KMS memory.

2. The method of claim 1, further comprising:
   storing the key, the key name, and the key type in a 3-tuple prior to encrypting the key, the key name, and the key type.

3. The method of claim 2, further comprising:
   encoding the key after storing the key in the 3-tuple.

4. The method of claim 1, further comprising:
   tagging the secret token to associate it with an application.

5. The method of claim 1, wherein encrypting the key, the key name, and the key type comprises:
   using a symmetric algorithm.

6. The method of claim 1, wherein encrypting the key, the key name, and the key type comprises:
   using an asymmetric algorithm.

7. The method of claim 1, wherein receiving data into the KMS comprises:
   using a graphical user interface.

8. The method of claim 7, wherein the graphical user interface is integrated into a web browser.

9. The method of claim 1, wherein the serialized file persists beyond the time the KMS is active and provides secure storage of the key and the KEK.

10. A system for securing encryption keys comprising:
    a key management system storage; and
    a key management system (KMS) configured to:
        receive data into the KMS, wherein the data comprises a key, a key name, and a key type, and wherein the data is received from a client over a network;

receive at least one key encryption key (KEK) into the KMS, wherein the KEK is received from the client using a smart card interfacing over the network with the KMS, wherein the smart card provides the KEK;

encrypt the key, the key name, and the key type using the KEK to generate a secret token, wherein the encryption is performed by the KMS;

hash the KEK to generate a hashed KEK;

generate a vector comprising the secret token and the hashed KEK, wherein the secret token comprises the encrypted key;

serialize the vector to generate a serialized file; and store the serialized file in KMS memory.

11. The system of claim 10, wherein the KMS is further configured to store the key, the key name, and the key type in an 3-tuple prior to encrypting the key, the key name, and the key type.

12. The system of claim 11, wherein the KMS is further configure to:

encode the key after storing the key in the 3-tuple.

13. The system of claim 10, wherein the KMS is further configured to:

tag the secret token to associate it with an application.

14. The system of claim 10, further comprising:

a graphical user interface.

15. The system of claim 14, wherein the graphical user interface is integrated into a web browser.

16. The system of claim 10, wherein the serialized file persists beyond the time the KMS is active and provides secure storage of the key and the KEK.

17. A computer readable medium storing instructions for execution on a key management system (KMS) processor, which when executed by the KMS processor cause the KMS processor to perform the steps of:

receiving data into the KMS, wherein the data comprises a key, a key name, and a key type, and wherein the data is received from a client over a network;

receiving at least one key encryption key (KEK) into the KMS, wherein the KEK is received from the client using a smart card interfacing over the network with the KMS, wherein the smart card stores the KEK;

encrypting the key, the key name, and the key type using the KEK to generate a secret token, wherein the encryption is performed by the KMS;

hashing the KEK to generate a hashed KEK;

generating a vector comprising the secret token and the hashed KEK, wherein the secret token comprises the encrypted key;

serializing the vector to generate a serialized file; and storing the serialized file in KMS memory.

18. The computer readable medium of claim 17, wherein the instructions further comprise instructions for:

storing the key, the key name, and the key type in a 3-tuple prior to encrypting the key, the key name, and the key type.

19. The computer readable medium of claim 18, wherein the instructions further comprise instructions for encoding the key after storing the key in the 3-tuple.

20. The computer readable medium of claim 17, wherein the instructions further comprise instructions for tagging the secret token to associate it with an application.

21. The computer readable medium of claim 17, wherein the instructions further comprise instructions for using a symmetric algorithm.

22. The computer readable medium of claim 17, wherein the instructions further comprise instructions for encrypting the key, the key name, and the key type using an asymmetric algorithm.

23. The computer readable medium of claim 17, wherein the serialized file persists beyond the time the KMS is active and provides secure storage of the key and the KEK.

* * * * *